Figure 6:
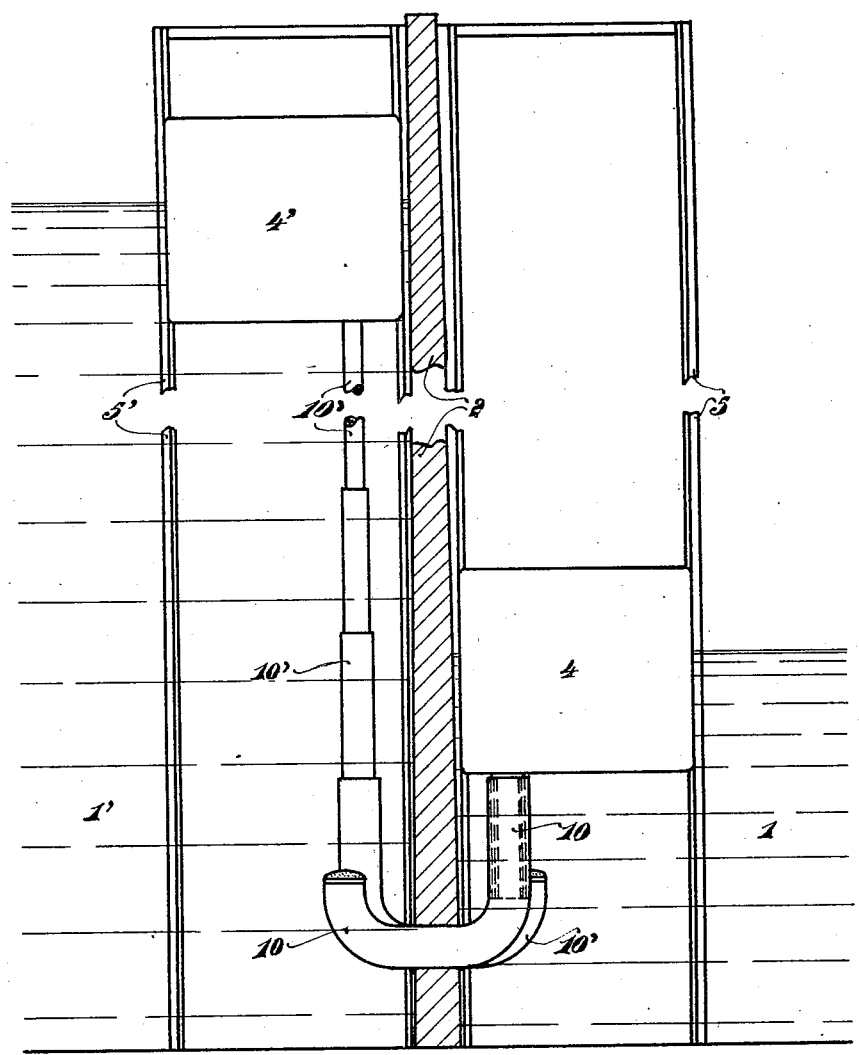

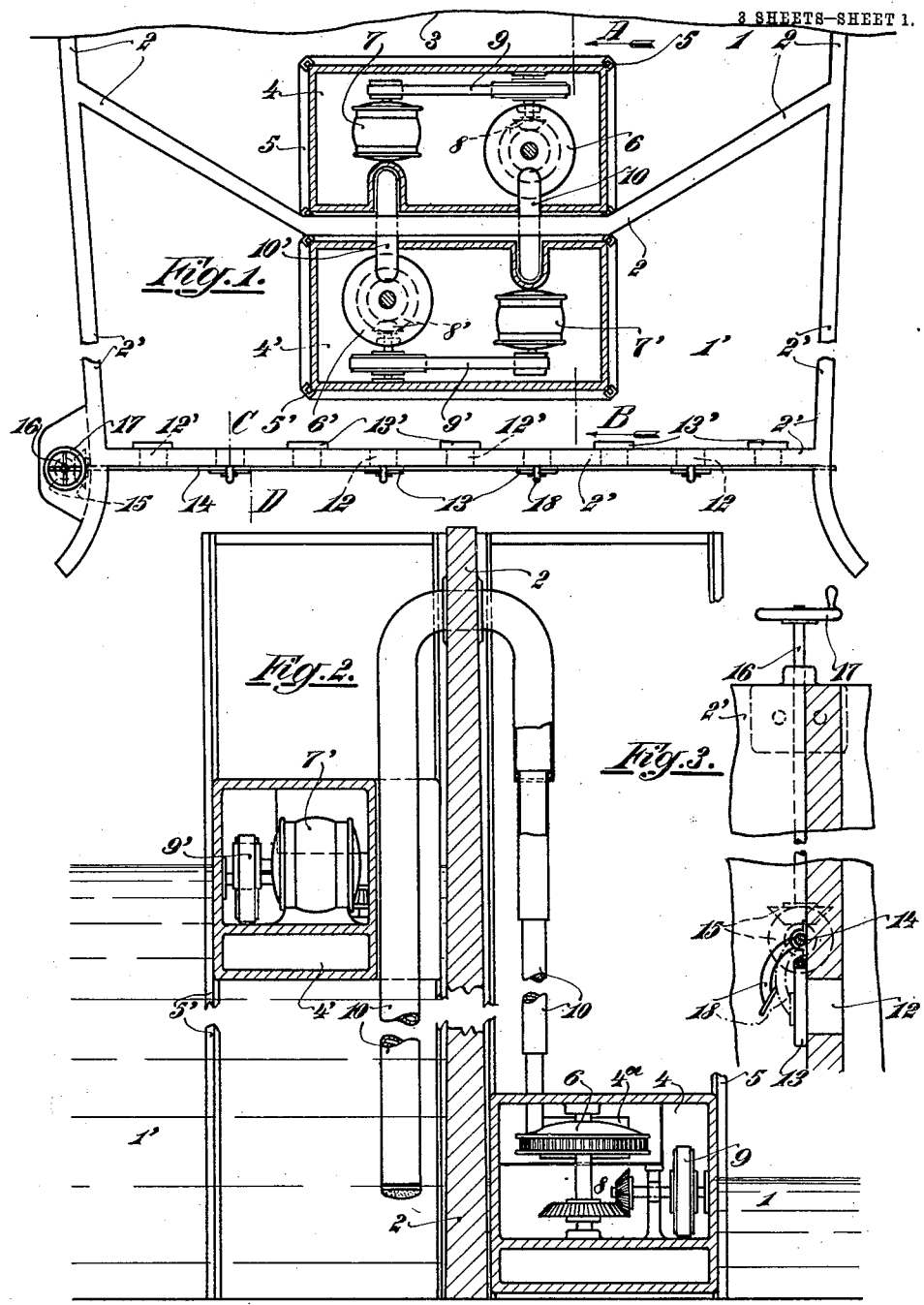

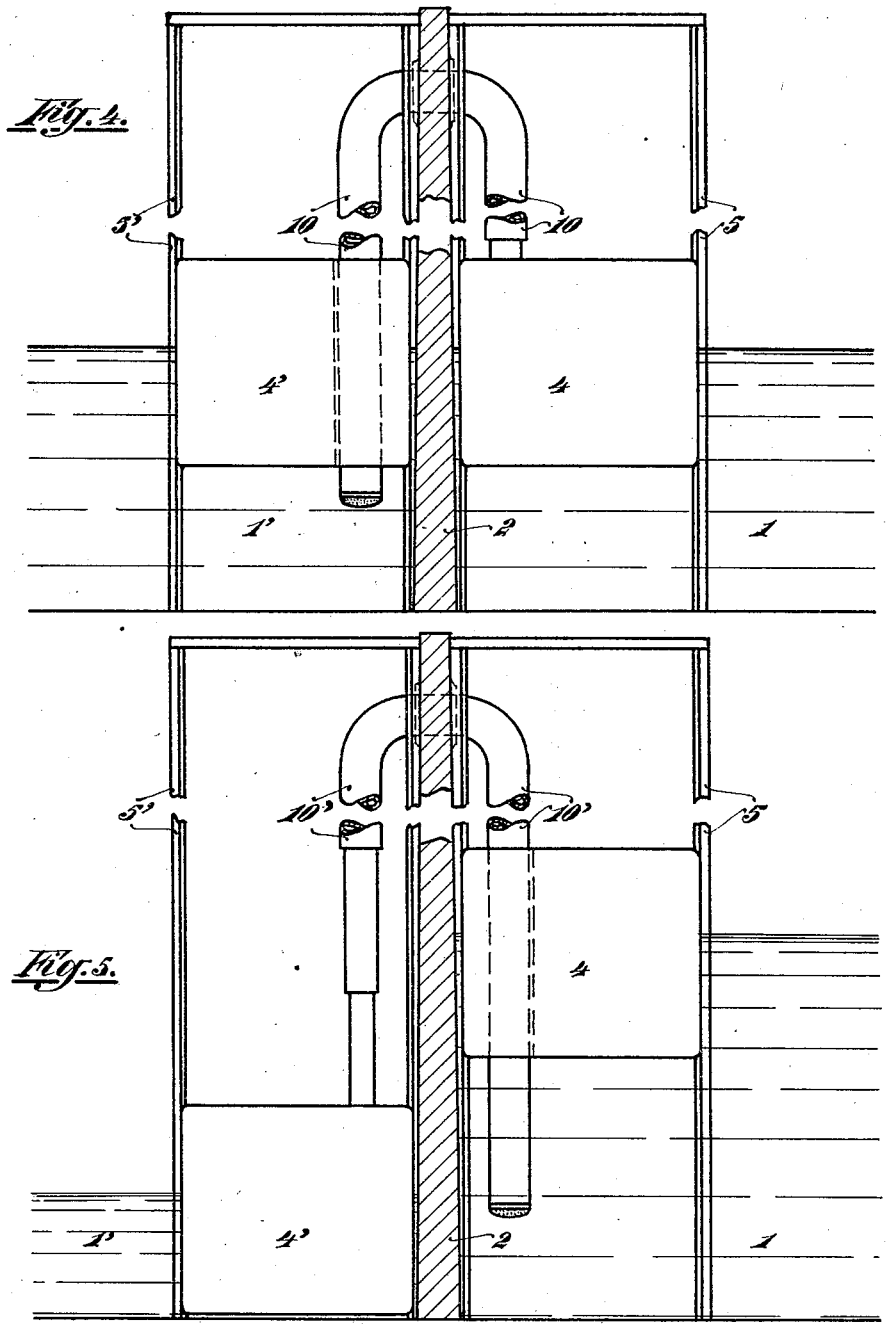

H. REXROTH.
APPARATUS FOR MAKING USE OF THE ENERGY OF THE TIDES.
APPLICATION FILED APR. 29, 1913.

1,085,823.

Patented Feb. 3, 1914.
3 SHEETS—SHEET 3.

UNITED STATES PATENT OFFICE.

HERMANN REXROTH, OF ODENKIRCHEN, GERMANY.

APPARATUS FOR MAKING USE OF THE ENERGY OF THE TIDES.

1,085,823.  Specification of Letters Patent.  Patented Feb. 3, 1914.

Application filed April 29, 1913. Serial No. 764,427.

*To all whom it may concern:*

Be it known that I, HERMANN REXROTH, manufacturer, a subject of the German Emperor, residing at Odenkirchen, Rhenish Prussia, in the Empire of Germany, have invented certain new and useful Improvements in Apparatus for Making Use of the Energy of the Tides, of which the following is a specification.

This invention relates to apparatus for making use of the energy of the tides. Various suggestions for this purpose have been made already, and among others the suggestion has been made to employ a float, the rise and fall of which would actuate the apparatus for storing or utilizing the power, the float being made to carry the apparatus in question.

The present invention relates to improved apparatus of this type, but differing from the known devices in various respects as hereinafter set forth.

The invention is illustrated by way of example in the accompanying drawings, wherein:—

Figure 1 is a plan view. Fig. 2 is a section on the line A—B of Fig. 1. Fig. 3 is a partial section on the line C—D of Fig. 1. Fig. 4 shows a side view partly in section, corresponding to the position of Fig. 2, but with the working parts in another position. Fig. 5 is a similar view showing the parts in a third position. Fig. 6 is a similar view showing a modified form of the apparatus according to the invention.

Referring first to the construction shown in Fig. 1, the apparatus includes a water space 1 inclosed by walls 2 and the shore 3. The size of this inclosed space or dam, the length of shore line, and all other dimensions of the respective parts of the mechanism hereinafter described, will depend upon the power to be developed and the amount of water necessarily dealt with for developing the power. Fig. 2 shows the apparatus at the period after ebb tide, when the dam 1 behind the wall 2 is emptied down to a level corresponding with the minimum amount of water which is left in it, sufficient just to support an inclosed float or pontoon 4. The sea is shown as having risen outside the wall 2 and having partially raised another float 4'. The floats 4 and 4' are constructed to rise and fall between fixed guide rails 5 and 5' which prevent any lateral displacement.

The float 4 carries a water turbine 6 and a dynamo 7 arranged to be driven therefrom, for instance through a gear 8 and belt 9. The driving fluid, *i. e.* the water, is supplied to the turbine 6 by a pipe 10 of inverted U-shape, the arm thereof which leads to the turbine being made up of telescoping sections while the other arm extends down into deep water at its lower end, and is held by the top portion being built into the wall 2, or otherwise held in a firm manner.

As the tide begins to rise the water rises outside the wall 2 but not inside the space 1 as that is cut off from the sea. When the water outside reaches the height above the level inside corresponding with the fall at which the turbine 6 is designed to operate, the flow is started through the pipe 10 setting the turbine 6 in action. This is supposed to be the condition of affairs at the position of the parts shown in Fig. 2, a suitable slide or valve (not shown) being opened in order to permit the flow of water through the pipe 10 to take place by siphon action. The turbine 6 in float 4 drives the dynamo 7, and this converts the power developed into electrical energy which is transmitted by cable under or above water (not shown) to any place on land where the energy is to be used. The water which escapes after driving the turbine, flows out by an opening 4ª in the float 4 and is received in the dam 1 which is thus gradually filled, causing the float 4 with the mechanism therein to rise gradually. By suitably choosing the size of the dam and of the turbine, siphon pipe and other parts, the rate at which the water rises inside the dam may be made to correspond with the rate at which it is rising outside the wall 2. Hence, until the tide has nearly attained its highest point, the drop or head of water at which the turbine is operated can be caused to remain very nearly the same. When the tide reaches its highest point the flow of water through the pipe 10 driving the turbine is stopped, and the water is allowed to flow into the dam 1 by means of sluices or other devices (not shown) which will permit the water to flow in and to fill the dam 1 so that the level inside will be brought in a short time to the high tide level outside, and the open sluices or the like can be closed again in order to keep the water in the dam 1 as the tide falls.

As the water rises in the dam 1 the float 4 with the mechanism therein is soon raised to the level of the float 4' outside, this position being indicated in Fig. 4. When the tide begins to ebb the water outside the wall 2 falls but the water level inside the dam remains the same. The float 4' falls until the drop between the levels inside and outside the wall 2 is sufficient for the driving of the turbine 6' in the float 4', whereupon the flow of water is allowed to begin through a second siphon pipe 10' which communicates with the turbine 6', and whose arm extends down beneath the lowest water level inside the dam 1. As the tide falls the method of working is therefore the same as when the tide is rising, but the flow of water is reversed and the power developed in the turbine 6' in this case is used to drive a dynamo 7' through a gearing 8' and the belt 9'.

The rising and falling of the water level of the sea does not take place with the same regularity or evenness as is the case inside the dam 1, because of the waves which vary in height according to weather conditions. Hence, if the float 4' were allowed to work simply in the sea itself it would be subjected to considerable shocks and would make up and down vibratory movements. In order to avoid this and to enable the float 4' to move up and down steadily a second wall 2' is built extending at each side from the wall 2, the form and strength of the wall 2' being determined according to the local conditions and forces to be met with. The outer part of this wall 2' is formed with openings 12 and 12' which are adapted to be closed respectively at their outer or inner faces by means of slides or flaps 13 and 13'; these flaps may be arranged to close under their own weight as indicated and to open when permitted to do so by the pressure of water tending to flow out at the side where the flaps are arranged. Above the flaps is a shaft 14 adapted to be turned by means of gearing 15, a shaft 16 and a handwheel 17. The shaft carries arms 18 corresponding in position with the flaps 13, so that when the shaft is turned in one direction the arms 18 will press upon the backs of the corresponding flaps holding them closed. As the tide rises the flaps 13 outside the wall 2' are closed and are prevented from opening by the arms 18, while the flaps 13 on the inside are free to open when caused to do so by the pressure of water from outside. Hence, when the waves strike against the wall 2' some of the water which reaches the openings 12' will flow into the dam 1' inside the wall 2' past the flaps 13'. The water cannot flow back again, however, because the flaps 13' will close again under their own weight and the water pressure behind them, while the flaps 13 are held closed, as mentioned above. This action is repeated each time when a wave strikes the front of the wall, or until the water level outside rises well above the set of openings 12 and 12' when the flow of water through the same will become more regular. The dam 1' is filled with water in this way while keeping a comparatively horizontal surface, so that at any rate the principal wave motions of the sea outside are eliminated. Hence, the flow of water through the pipe 10 to the apparatus in the float 4 is caused to be sufficiently steady and even. The use of the dam 1' also has the advantage that the float 4' with its mechanism is largely protected from the shocks or sudden movements which would be produced by the waves, and is allowed to work under more favorable circumstances.

When the tide begins to ebb the flaps 13 which close the openings 12 are released by turning the handwheel 17 so that the water can flow through the openings 12, lifting the flaps 13. The float 4' is consequently allowed to fall gradually and regularly as is required.

With this arrangement the water in the dam 1' can be accumulated to a higher level than the mean level of the tide outside, because the water is forced into the dam 1' partly by the wave oscillations, but is prevented from flowing back. There may be any desired number of rows of openings 12 and 12', at various heights in the outer wall 2', so that the water can begin to flow in directly after it begins to rise and can continue to flow in through higher and higher sets of openings as the tide comes in. When the waves are high, therefore, a greater rise and fall of the water can be obtained than in still weather, and in particular this rise and fall can be greater than can be secured if the outer wall 2' were not used. It has been mentioned already that valves or slides may be used to start and stop the flow of water through the pipes 10 and 10'. These valves, slides or the like are closed after the working periods of the respective turbines 6 and 6' and may be kept closed until the next working period so that a column of water in the pipes 10 and 10' is maintained, and the siphon action will take place at once when the water is free to flow again. Hence, any special apparatus for sucking up or pumping up the water to start the siphon in action is not necessary, although it may be provided if desired.

The flow of water to the turbines 6 and 6' may be caused to take place in the alternative manner shown in Fig. 6. In this case the pipes 10 and 10' are reversed in position and pass through the dividing wall 2 below the lowest water level, while their telescoping ends communicate from below with the respective floats 4 and 4', and the other arms of the pipes can be made very short as shown, to communicate freely with the water in the spaces 1 and 1'. In this case when the water at one side of the wall 2 attains the necessary height for actuating the mechanism in the float at the other side, the slide, valve or the like, in the corresponding pipe 10 or 10' is opened as before allowing the water to flow through. The telescoping sections of the pipes permit their long arms to follow the movements of the floats 4 and 4', as the water levels rise and fall.

Having now particularly described and ascertained the nature of my said invention and in what manner the same is to be performed, I declare that what I claim is:—

1. An apparatus for utilizing the power of the tides comprising in combination: a wall forming a dam against the sea, a float behind said wall which rises and falls with the water inside the dam, apparatus for utilizing the water mounted upon said inner float, a second float outside the wall, apparatus for utilizing the water power mounted upon said outer float, and telescoping pipes connected with said apparatuses designed to allow the water to flow alternately from the side where it is higher to the apparatus on the float at the side where the water is lower, substantially as described.

2. An apparatus for utilizing the power of the tides comprising in combination: a wall forming a dam against the sea, a float behind said wall which rises and falls with the water inside the dam, apparatus for utilizing the water power mounted upon said float, a subsidiary inclosure having apertures through which the water can flow, a second float outside the wall in said subsidiary inclosure, apparatus for utilizing the water power mounted upon said outer float, and telescoping pipes connected with said apparatuses designed to allow the water to flow alternately from the side where it is higher to the apparatus in the float at the side where the water is lower, substantially as described.

3. An apparatus for utilizing the power of the tides comprising in combination: a wall forming a dam against the sea, a float behind said wall which rises and falls with the water inside the dam, apparatus for utilizing the water power mounted upon said float, a subsidiary inclosure having apertures through which the water can flow hinged flaps in said apertures for regulating the flow of the water, a second float outside the wall in said subsidiary inclosure, apparatus for utilizing the water power mounted upon said outer float, and telescoping pipes connected with said apparatuses designed to allow the water to flow alternately from the side where it is higher to the apparatus in the float at the side where the water is lower, substantially as described.

4. An apparatus for utilizing the power of the tides comprising in combination: a wall forming a dam against the sea, a float behind said wall which rises and falls with the water inside the dam, apparatus for utilizing the water power mounted upon said float, a subsidiary inclosure having inlet apertures and outlet apertures, devices for keeping said outlet apertures closed during the rising of the tide, means for releasing said closing devices when the tide is falling, a second float outside the wall in said subsidiary inclosure, apparatus for utilizing the water power mounted upon said outer float, and telescoping pipes connected with said apparatuses designed to allow the water to flow alternately from the side where it is higher to the apparatus in the float at the side where the water is lower, substantially as described.

In testimony whereof I affix my signature in presence of two witnesses.

HERMANN REXROTH.

Witnesses:
 Louis Vandory,
 Bessie F. Dunlap.

---

Copies of this patent may be obtained for five cents each, by addressing the "Commissioner of Patents, Washington, D. C."